(12) United States Patent
Rumsey et al.

(10) Patent No.: US 6,677,519 B2
(45) Date of Patent: Jan. 13, 2004

(54) HIGH VOLTAGE SPLICE BOX FOR WET LOCATIONS

(75) Inventors: Roger L. Rumsey, Wichita, KS (US); Tyler B. Brown, Wichita, KS (US)

(73) Assignee: Relight America, Inc., Wichita, KS (US)

( * ) Notice: Subject to any disclaimer, the term of this patent is extended or adjusted under 35 U.S.C. 154(b) by 138 days.

(21) Appl. No.: 09/932,748

(22) Filed: Aug. 17, 2001

(65) Prior Publication Data

US 2003/0205396 A1 Nov. 6, 2003

Related U.S. Application Data

(60) Provisional application No. 60/226,222, filed on Aug. 18, 2000.

(51) Int. Cl.[7] .................................................. H02G 3/08
(52) U.S. Cl. ............................. 174/50; 174/58; 174/66; 220/4.02; 439/535
(58) Field of Search .............................. 174/50, 48, 58, 174/63, 60, 64; 220/4.02, 3.8; 439/535; 248/906

(56) References Cited

U.S. PATENT DOCUMENTS

| | | | |
|---|---|---|---|
| 3,605,064 A | 9/1971 | Routh et al. ................... 339/21 |
| 3,641,253 A | 2/1972 | Weagant ...................... 174/93 |
| 3,818,124 A | 6/1974 | Jirka ........................... 174/93 |
| 3,864,511 A | * 2/1975 | Morby et al. .................. 174/58 |
| 3,962,574 A | 6/1976 | Zurla ........................... 240/81 |
| 4,246,436 A | 1/1981 | Hoffman et al. ............... 174/52 |
| 4,373,776 A | 2/1983 | Purdy ........................ 350/96.2 |
| 4,599,484 A | 7/1986 | Bramwell ..................... 174/52 |
| 4,654,470 A | 3/1987 | Feldman et al. ............... 174/50 |
| D313,396 S | 1/1991 | Messelhi .................... D13/154 |
| 5,049,703 A | 9/1991 | Simon ....................... 174/52.1 |
| 5,071,220 A | 12/1991 | Ruello et al. ................ 385/135 |
| 5,168,422 A | 12/1992 | Duncan ....................... 361/377 |
| 5,382,752 A | 1/1995 | Reyhan et al. ................. 174/50 |
| 5,389,740 A | * 2/1995 | Austin ......................... 174/67 |
| 5,449,860 A | * 9/1995 | Buckshaw et al. ............. 174/67 |
| 5,725,390 A | 3/1998 | Watts .......................... 439/410 |
| 5,742,489 A | 4/1998 | Riesland ..................... 361/836 |
| 5,773,756 A | 6/1998 | DiTullio ....................... 174/37 |
| 5,777,843 A | 7/1998 | Younce ....................... 361/641 |
| 5,797,763 A | 8/1998 | Saka et al. ................... 439/402 |
| 5,933,563 A | * 8/1999 | Schaffer et al. ............. 385/135 |
| 5,998,736 A | 12/1999 | Rumsey ....................... 174/84 |
| 6,186,838 B1 | 2/2001 | Foster ........................ 439/797 |
| 6,201,922 B1 | 3/2001 | Milanowski et al. ........ 385/135 |

* cited by examiner

*Primary Examiner*—Dhiru R Patel
(74) *Attorney, Agent, or Firm*—Gable & Gotwals; Paul H. Johnson

(57) ABSTRACT

A high voltage splice box formed of non-conductive material having a back wall and an integral side and end walls around the full periphery of the back wall and providing an enclosed area within open front having a front peripheral edge. A post is formed of electrically non-conductive material extending from the back wall and spaced from the side wall and has a top attachment surface at a height less than the depth of the side wall, the attachment surface providing a place where multiple conductors can be interconnected. A cover has a circumferential lip sealably attached to the box front peripheral edge. The post attachment surface is spaced from the box back wall, side walls, end walls and cover at distances to prevent arching between a conductor secured to the post attachment surface and conductive objects exterior of the box.

15 Claims, 2 Drawing Sheets

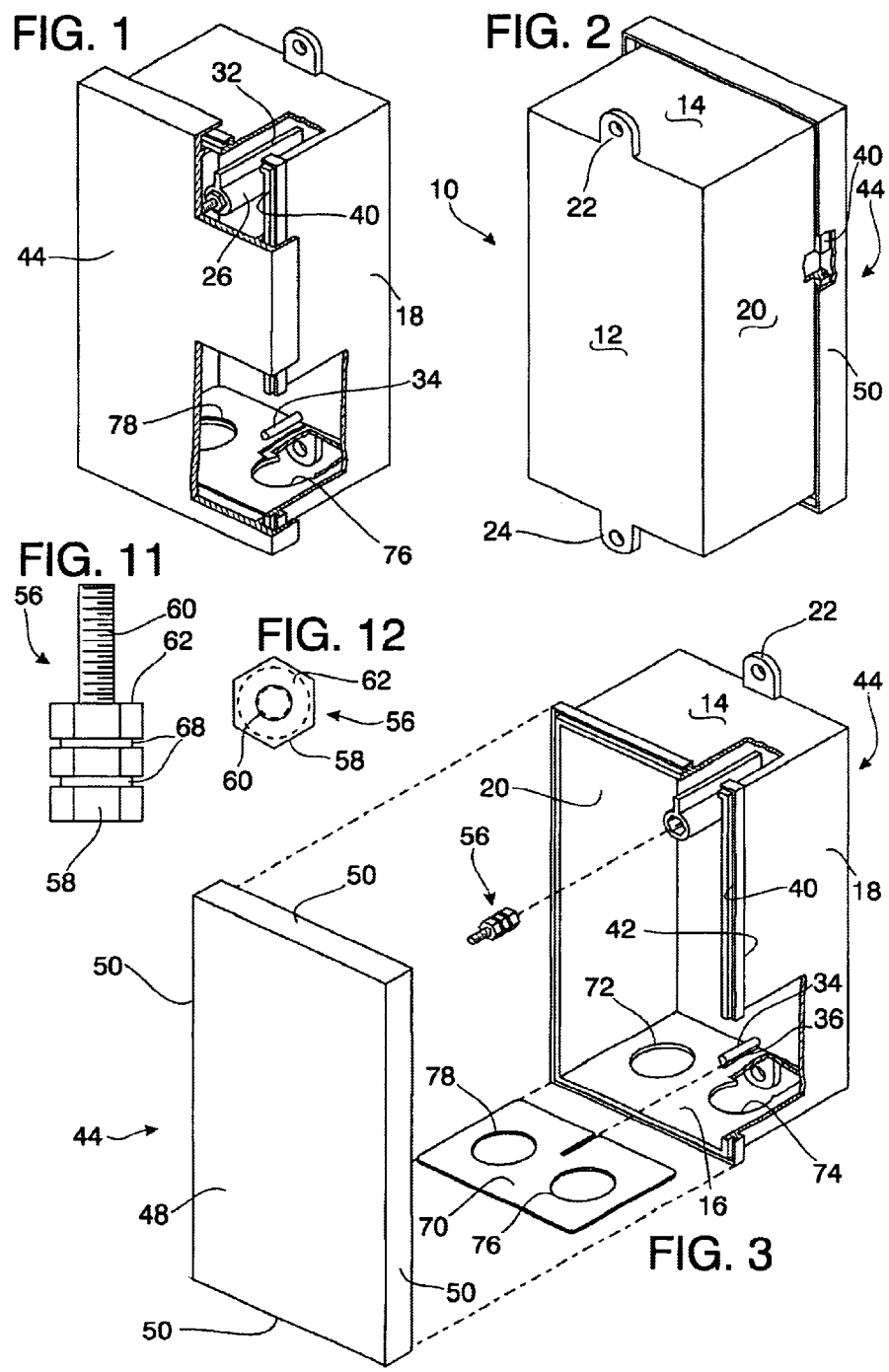

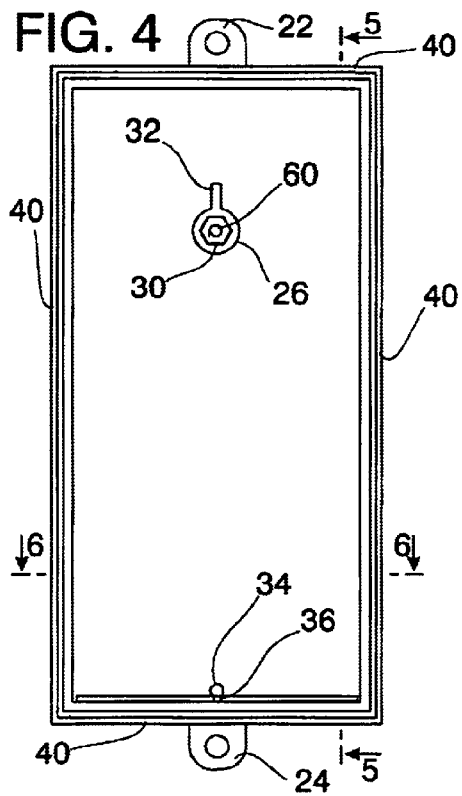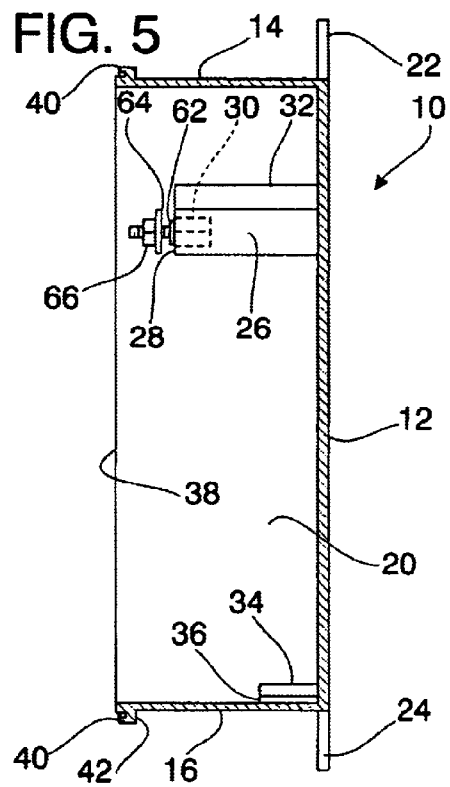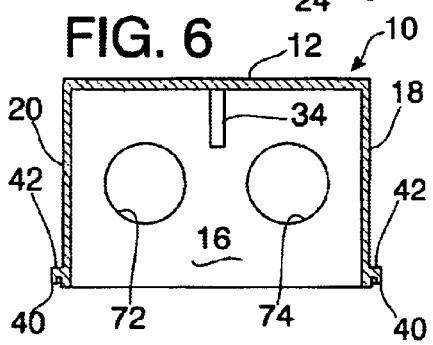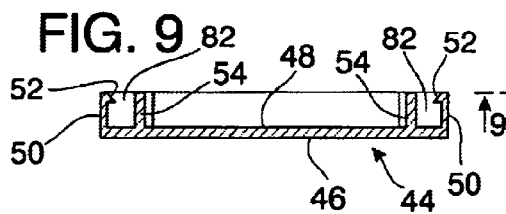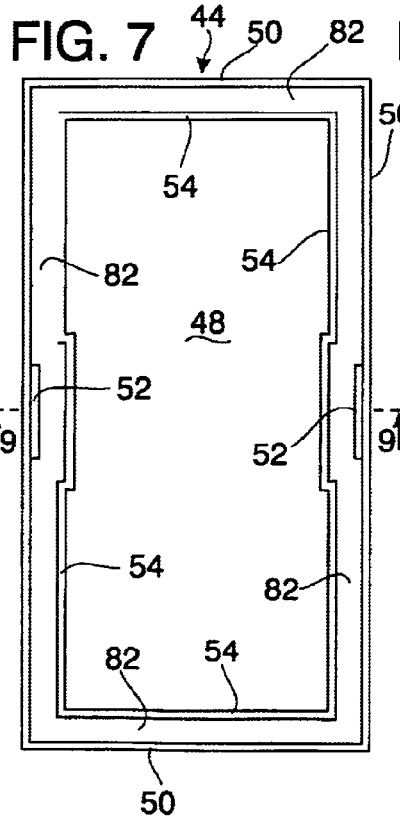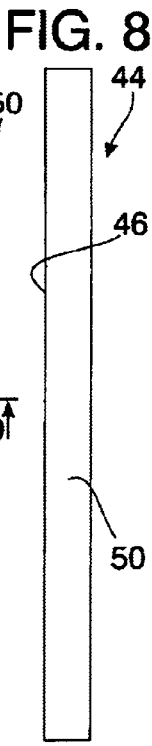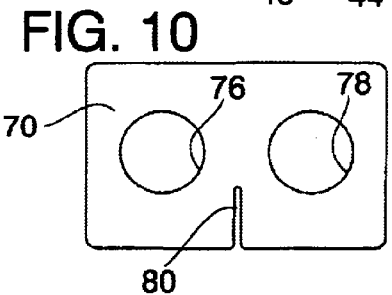

US 6,677,519 B2

HIGH VOLTAGE SPLICE BOX FOR WET LOCATIONS

REFERENCE TO PENDING APPLICATIONS

This application is related to U.S. Provisional Patent Application Serial No. 60/226,222 entitled HIGH VOLTAGE SPLICE BOX FOR WET LOCATIONS filed Aug. 18, 2000. This application is not related to any international applications or in any Microfiche Appendix.

BACKGROUND OF THE INVENTION

Neon gas lighting systems utilize high voltage molecular excitation to activate the gas contained therein. Neon lights are popular for the identification of businesses because they provide a brilliant, attractive and attention getting visual effect and are, for the level of attractiveness they create, relatively energy efficient compared to other types of flourescent and incandescent lighting systems. A problem that has existed however with neon lights is that they require high voltage that can be the source of arcing and fires. This invention is concerned with a splice box to facilitate wiring of neon signs and particularly for connecting together the ends of lengths of high voltage cables in wet locations.

Because of the danger of fire, the installation of neon signs in some communities is opposed. However, recent improvements in high voltage grounded wiring have made the installation of neon signs substantially less dangerous. For background information relating to wiring and connections for wiring used in the installation of neon signs, reference may be had to U.S. patent application Ser. No. 60/176,268 filed Jan. 14, 2000 and entitled, "WATERPROOF HIGH VOLTAGE CONNECTOR".

A particular problem in wiring neon signs is that frequently wiring connections must be made in wet locations. "Wet locations" include areas that are subject to moisture and that are exposed to outdoor weather. Any location that is wet or where surfaces of electrical equipment are wet increases the possibility of arcing of high voltage electrical current and also the possibility of personal energy.

An object of the present invention is to provide a high voltage splice box that is particularly adaptable for use in wet locations.

SUMMARY OF THE INVENTION

This invention provides a high voltage splice box that is particularly useful in splicing conductors in a wet location. By "wet location" is meant a location having high humidity or where water spray may inadvertently happen from time to time. The term "wet location" is not meant to include submerged locations—that is, the invention is not meant to be a box for making high voltage connections underwater.

The high voltage splice box is made up of a box formed of electrically non-conductive material, that is, particularly plastic although the box could be formed of fiberglass however, from practical and economical purposes the box is preferably injection molded of high quality plastic. The box has a back wall and an integral side wall. The side wall of the box could be circular in which case, of course, the back wall would be circular, however in the illustrated and the preferred embodiment the box is preferably rectangular with a rectangular back wall and with the rectangular side walls and end walls. The side walls, whether circular, square or rectangular in configuration, are of the same depth throughout around the full periphery of the back wall and provide an enclosed area with an open front having a front peripheral edge.

The box has at least one opening but normally will typically include two openings spaced apart as illustration, the opening or openings being formed in a side wall. The openings communicate from the exterior box into the enclosed area formed by the box.

An attachment surface is provided within the enclosed area formed by the box. The expression "attachment surface" means a surface that can support the attachment of two or more electrical conductors. In the illustrated embodiment, this attachment surface is provided by a top surface of a post formed of electrically non-conductive material extending from the interior surface of the back wall. In the preferred arrangement the post is integrally formed with the box and particularly with the back wall of the box. The attachment surface, which is the same as the post top surface, is spaced away from the box back wall and side walls and is of a height less than the depth of the side walls. The attachment surface provides a place where multiple conductors can be interconnected.

A cover is formed of electrically non-conductive material. The cover has a front wall and an integral circumferential lip around the full periphery of the front wall. The cover circumferential lip is configured to be sealably and removably attached to the box front peripheral edge. With the cover in place the attachment surface, that in the illustrated embodiment is the post top surface, is thereby spaced away from the box back wall, the side walls and from the cover, the spacing being such as to substantially prevent the chance of arcing between a conductor secured to the attachment surface and any conductive element that is exterior of the box—that is, exterior of the box back wall, side walls and front cover. It can be seen that the dimension of the box is best determined in part by the maximum voltage for which the box is constructed—that is, a greater voltage requires more space to prevent arcing. A second consideration in the dimensions of the box is that which is sufficient to provide for making an interconnection between two or more electrical conductors.

The box is preferably constructed so that the attachment surface (in the illustrated embodiment, the top surface of an integral post) has a recess therein. A metallic electrical conductive attachment element has a base portion configured to be received and retained within the recess. Extending from the attachment element base portion is a threaded portion that extends above the attachment surface and is adapted to receive electrical conductors wound thereon. A nut received on the threaded portion retains the electrical conductors on the metallic electrical conductive attachment element. In a preferred arrangement the recess is non-circular such as "hexagonal" and the electric attachment element base portion is of similar configuration and dimension so that it is slidably but snugly received within the recess.

In a preferred construction, the electric attachment base portion has an upper surface and the recess is dimensioned so that when the attachment element base portion is positioned in the recess, the upper surface of the attachment element extends slightly above the attachment surface. In this way, when electrical conductors are wound about the attachment element threaded portion and a nut is threaded onto the threaded portion, the conductors are forced against the top surface of the attachment portion rather than against the attachment surface so that there is no tendency to extract the attachment element from the recess in which it is positioned.

It is important that the cover be sealably received by the box so as to prevent water from entering the interior of the box when the cover is in place. For this purpose the box front peripheral edge has an integral flange portion providing an outwardly extending locking ledge. The cover has a circumferential lip with a concave channel that receives the box peripheral flange portion when the cover is in closed position on the box. In a still more preferred embodiment, the cover circumferential concave channel has, for at least a portion of its periphery, an integral inwardly extending tapered tang portion that engages the box flange portion locking ledge to thereby retain the cover in closed position on the box. To permit the cover to be removed, the cover lip circumferential channel is preferably configured to permit the box peripheral edge to be inwardly deflected or the cover concave channel to be outwardly deflected.

High voltage electrical systems usually employ either a rigid or a flexible conduit in which conductors are retained and in the typical application of the high voltage splice box for wet locations of this invention the box will be configured to receive conduits. It is important that the conduits be grounded to each other—that is, that continuity be provided between the conduits. Since the box itself is preferably of non-conductive plastic material, a system needs to be provided to afford continuity between separate conduits extending to the box. For this purpose, a ground member is provided in the box. The ground member is formed of electrically conducted material such as, in the illustrated and the preferred embodiment, a flat plate of metal such as a flat relatively thin sheet of copper. The small metal ground plate has openings therein conforming to the openings in the box. The ground plate is configured so that when positioned in the box it engages the internal surface of a portion of the box side wall and when the box is rectangular, it engages the internal surface of one end of the box. When conduits are extended into the box they are typically secured by means of locknuts. By employing a thin metal conductive ground plate in the box, continuity between conduits extending to the box is assured.

A better understanding of the invention will be obtained from the following detailed description of a preferred embodiment and the claims, taken in conjunction with the attached drawings.

DESCRIPTION OF THE DRAWINGS

FIG. 1 is an isometric view, partially broken away showing a high voltage splice box and a cover locked in place on the box. In FIG. 1 and the other drawings, wiring is not shown, the invention being a box used to interconnect two lengths of wire.

FIG. 2 is an isometric external rear view of a splice box and cover of this invention.

FIG. 3 is an isometric exploded view of a high voltage splice box and cover with the cover removed and showing a ground plate as employed in the box.

FIG. 4 is an elevational front view of a high voltage splice box of FIGS. 1–3 with the cover removed—that is, showing the front of the box including the exposed interior of the box.

FIG. 5 is a cross-sectional view as taken along the line 5—5 of FIG. 4 showing the construction of the box.

FIG. 6 is a horizontal cross-sectional view taken along the lines 6—6 of FIG. 4 showing construction of the box.

FIG. 7 is an elevational view of the inside surface of the box cover, the cover being seen in FIGS. 1–3.

FIG. 8 is an elevational side view of box cover of FIG. 7.

FIG. 9 is a cross-sectional view of the box cover taken along the line 9—9 of FIG. 7.

FIG. 10 is a plan view of the grounding plate used within the box to provide ground connection from one conduit to another.

FIGS. 11–12 are plan views of an attachment element.

DETAILED DESCRIPTION OF A PREFERRED EMBODIMENT

Referring to the drawings and first to FIGS. 4, 5 and 6 a high voltage splice box of this invention is generally indicated by the numeral 10. The box 10 is preferably made of plastic and has an integrally formed back 12, a top wall 14, a bottom wall 16, a first side wall 18 and a second side wall 20. Integrally formed tabs 22 and 24 that are co-planer with back 12 provide a means by which box 10 can be attached to a support surface.

The interior of box 10 is essentially an open space except for an integral upstanding post 26, the post being integrally formed with back 12. The top 28 of post 26 which serves as an attachment surface, is at a height less than the height of the splice box wall surfaces 12, 14, 16 and 18. Formed in the top or attachment surface 28 of post 26 is a recess that is non-circular such as, in the illustrated arrangement, hexagonal, the recess being indicated by the numeral 30.

Post 26 has an integral wing portion 32 whose function is to add rigidity to the post as it extends upwardly from the inner surface of back wall 12. Wing portion 32 is not critical—increased rigidity can be obtained by increasing the diameter of the post.

Integrally formed on the interior of bottom wall 16 is a short length cylindrical projection 34 having a reduced width web portion 36. The function of the cylindrical projection 34 will be described subsequently.

Integrally formed around the exterior top surface 38 of the box—that is, integrally formed with top wall 24, bottom wall 16, first side wall 18 and second side wall 20 is a flange portion 40, the flange portion providing a circumferential locking ledge 42.

A cover used to close box 10 is generally indicated by the numeral 44, the cover being illustrated specifically in FIGS. 7, 8 and 9. Cover 44 has a planer outer wall 46, the inside surface 48 of which is seen in FIGS. 7 and 9. Integrally extending from central portions of circumferential lip 50 are inwardly projecting tang portions 52 as seen in FIGS. 7 and 9. The tang portion 52 serve to lock covers 44 in place when forced onto box 12—that is, the tang portions 52 extend to contact the locking ledge 42 provided by box flange portion 40.

Cover 44 further has an internal circumferential integral ledge 54 that is spaced from the cover circumferential lip 50. As seen in FIG. 7, the internal ledge 54 is inwardly offset in the areas of the circumferential lip tang portions 52. Internal ledge 54 is dimensioned to match closely but at the same time to be telescopically receivable within the walls surrounding top surface 38 of box 10.

As previously described, post 26 has a non-circular recess 30 in the top surface 28, the recess being illustrated as being hexagonal. Received in hexagonal recess 30 is a metallic attachment element 56 shown in detail in FIGS. 11 and 12. Attachment element 56 is preferably made of conductive material such as copper or copper alloy and has a hexagonal base portion 58 and an integral reduced diameter threaded portion 60.

Base portion 58 has an upper surface 62 that, when the base portion 58 is positioned within post hexagonal recess 30 extends slightly above the post top surface 28. This dimensional relationship helps insure that attachment element 56 remains securely within recess 30 when wires are attached to it. As seen in FIG. 5, received on the threaded portion 60 is a washer 64 and nut 66. High voltage conductors are attached to each other by wrapping exposed portions around post 66 and then downwardly threading nut 66. The conductors are forced by washer 66 downwardly into engagement with attachment element top surface 62 so that therefore there is no force applied tending to extract attachment element 56 from recess 30.

As shown in FIG. 11, the hexagonal portion 58 of attachment element 56 has external circumferential grooves 68. These are provided to receive bonding material that is utilized to retain attachment element 56 within opposed recess 30.

An important element of the high voltage splice box for wet locations of this invention is a ground plate 70 as seen in FIGS. 1, 3 and 10. Ground plate 70 is a flat plate of conductive material such as copper, zinc or the like. The ground plate is dimensioned to have a length less than the internal width of box bottom wall 16 and a depth that is less than the depth of bottom wall 16. Formed in bottom wall 16 of box 10 as seen in FIGS. 6 and 10 are spaced apart openings 72 and 74. Ground plate 70 has matching openings 76 and 78. Further, the ground plate has a slot 80 that is dimensioned to receive web portion 36 of cylindrical projection 34 formed on the interior of the box bottom wall 16. Ground plate 70 is slid into position as indicated by the dotted line in FIG. 3 so that the ground plate is held in position with openings 76 and 78 in the ground plate aligned with openings 72 and 74 in box bottom wall 16 as seen in FIG. 1.

The high voltage splice box for wet locations as has been described is used by inserting the threaded portion of conduit or cable connectors (not seen) through the aligned openings in box bottom wall 16 and ground plate 70. Nuts (not seen) are tightened on each of the conduit or cable connectors, the nuts engaging ground plate 70. In this way, two rigid conduits or two flexible conduits or one rigid conduit and one flexible conduit are receivable within the box and as the nuts holding the conduit connectors are secured to the box the conduits are securely electrically interconnected—that is, grounded to each other by ground plate 70. Thereafter, the central conductive portion of high voltage cables are wrapped around connector element threaded portion 60 and nut 66 tightened to securely electrically interconnect the ends of cable conductor portions to each other. Cover 44 can then be snapped into position. The interrelationship between the box circumferential flange portion 40 and the channel 82 formed by the cover outer circumferential lip 50 and internal circumferential ledge 54 forms a water tight seal between the cover and the box to prevent the entrance of water or moisture into the box. Further, the box is so constructed that the point of interconnection of the high voltage cables—that is, the top of post 26, is spaced a safe distance from box back wall 12, top wall 14, bottom wall 16 and side walls 18 and 20, insuring that the electrical connection achieved at the exposed ends of cable conductors is isolated from any conductive object that could come into contact with the exterior of the box.

The cover 44 is removable from box 10 by inserting an end of a screwdriver within the circumferential lip 50 adjacent the tang portions 52 to outwardly displace the tang portions from the box or at least outwardly displace one of the tang portions from the box so that the cover can be removed. However, this is accomplished with difficulty so that the cover, once installed, makes the interior of the box essentially tamper-proof except by workman provided with the skill, knowledge and tools needed to remove the cover.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A high voltage splice box comprising:
   a box formed of electrically non-conductive material having a back wall and an integral side wall of selected depth around the full periphery of said back wall and providing an enclosed area with an open front having a front peripheral edge and the box having at least one opening formed in said side wall communicating with said enclosed area;
   a post formed of electrically non-conductive material extending from an interior surface of said back wall and spaced from said side wall and having an attachment surface at a height less than said depth of said side wall, said attachment surface having a recess therein;
   a metallic electrically conductive attachment element having a base portion received in said recess and a threaded portion extending past said post attachment surface and adapted to receive electrical conductors wound thereon;
   a nut received on said threaded portion to retain electrical conductors; and
   a cover formed or electrically non-conductive material having a front wall and an integral circumferential lip around the full periphery of said front wall, said cover circumferential lip being sealably and removably attached to said box front peripheral edge, said post attachment surface being spaced from said box back wall and side wall and from said cover front wall at distances to substantially prevent the chance of arching between a conductor secured to said attachment element and conductive objects exterior of said box back wall, side wall and cover front wall.

2. A high voltage splice box according to claim 1 in which said back wall is rectangular and in which said integral side wall is formed of two planar side panels and two planar end panels and wherein said cover front panel is rectangular and wherein said at least one opening is in one of said end panels.

3. A high voltage splice box according to claim 1 wherein said electrically conductive attachment element base portion has an upper surface from which said threaded portion extends and wherein said conductive element base portion upper surface is positioned above said post tip surface so that thereby when said nut is tightened against conductors received on said attachment element base portion force will not be applied tending to extract said attachment element base portion from said recess.

4. A high voltage splice box according to claim 1 wherein said recess in said post top surface is non-circular in cross-section and wherein said attachment element base portion is non-circular in cross-section and configured and dimensioned to be snugly received in said recess.

5. A high voltage splice box according the claim 1 wherein said box front peripheral edge has an integral flange portion providing an outwardly extending locking ledge and wherein said cover lip has a circumferential concave channel that receives said box peripheral edge flange portion when said cover is in closed position on said box.

6. A high voltage splice box according to claim 5 wherein said cover lip circumferential channel has, for at least a portion of said cover periphery, an integral inwardly extending tapered tang portion that engages said box flange portion locking ledge to retain said cover in closed position on said box.

7. A high voltage splice box according to claim 6 wherein said cover lip circumferential channel is configured to permit a said box side wall adjacent said front peripheral edge to be inwardly deflected or said cover concave channel to be outwardly deflected to permit said cover to be removed from said box.

8. A high voltage splice box according to claim 1 wherein said box side wall has two adjacent openings therein and including:
a ground member plate formed of electrically conductive material having two openings therein in a geometrical pattern matching said two openings in said box side wall and positioned in continuity with an interior surface of a portion of said side wall having said two openings therein.

9. A high voltage splice box according to claim 8 wherein said box has an integral, elongated cylindrical projection extending from said box side wall and positioned between said two openings therein and wherein said projection in cross-section has an elongated reduced width integral web portion and wherein said ground member plate has an elongated narrow width slot therein, the slot slidably receiving said projection web portion by which said ground member plate is retained in place within said box.

10. A high voltage splice box comprising:
a box formed of electrically non-conductive material having a back wall and integral side walls and end walls of selected depth around the full periphery of said back wall and providing an enclosed area with an open front having a front peripheral edge and the box having at least two openings formed in one of said end walls, the openings communicating with said enclosed area;
an attachment surface provided within said enclosed area by electrically non-conductive material extending from said back wall, the attachment surface being spaced from said back wall, said side walls and said end walls and from said front peripheral edge and providing means whereby electrical conductors can be interconnected;
a ground member plate formed of electrically conductive material having at least two openings therein in a geometrical pattern matching said at least two openings in said box end wall and positioned in continuity with an interior surface of said end wall having said at least two openings therein; and
a cover formed of electrically non-conductive material having a front wall and an integral circumferential lip around the full periphery thereof, the cover circumferential lip being sealably and removably attached to said box front peripheral edge, wherein said box has an integral, elongated projection extending from said box end wall between said openings therein and wherein said projection in cross-section has an elongated reduced width integral web portion and wherein said ground member plate has an elongated narrow width slot therein, the slot slidably receiving said projection web portion by which said ground member plate is retained in place within said box.

11. A high voltage splice box according to claim 10 wherein said box side wall has a first and second said openings therein spaced adjacent to each other and wherein said ground member is a plate of relatively thin metal having first and second openings therein that register with said box side wall first and second openings.

12. A high voltage splice box comprising:
a box formed of electrically non-conductive material having a back wall and integral side and end walls of selected depth around the full periphery of said back wall and providing an enclosed area with an open front having a front peripheral edge and the box having at least one opening formed in a said end wall communicating with said enclosed area;
a post formed of electrically non-conductive material extending from an interior surface of said back wall and having an attachment surface at a height less than said depth of said side walls, said attachment surface providing a place where multiple conductors can be interconnected; and
a cover formed of electrically non-conductive material having a front wall and an integral circumferential lip therearound, said cover circumferential lip being sealably and removably attached to said box front peripheral edge, said post attachment surface being spaced from said box back wall, said side walls, said end walls and from said cover front wall at distances to substantially prevent the chance of arching between a conductor secured to said post attachment surface and conductive objects exterior of said box back wall, side and end walls and said cover front wall wherein said box front peripheral edge has an integral flange portion providing an outwardly extending locking ledge and wherein said cover lip has a circumferential concave channel that receives said box peripheral edge flange portion when said cover is in closed position on said box and wherein said cover lip circumferential channel has, for at least a portion of said cover periphery, an integral inwardly extending tapered tang portion that engages said box flange portion locking ledge to retain said cover in closed position on said box.

13. A high voltage splice box according to claim 12 wherein said cover lip circumferential channel is configured to permit a said box side wall adjacent front peripheral edge to be inwardly deflected or said cover concave channel to be outwardly deflected to permit said cover to be removed from said box.

14. A high voltage splice box according to claim 12 wherein a said box end wall has two adjacent openings therein and including:
a ground member plate formed of electrically conductive material having two openings therein in a geometrical pattern matching said two openings in said box end wall and positioned in continuity with an interior surface of a portion of said end wall having said two openings therein.

15. A high voltage splice box according to claim 14 wherein said box has an integral, elongated cylindrical projection extending from a said box end wall and positioned between said two openings therein and wherein said projection in cross-section has an elongated reduced width integral web portion and wherein said ground member plate has an elongated narrow width slot therein, the slot slidably receiving said projection web portion by which said ground member plate is retained in place within said box.

* * * * *